United States Patent
Oh et al.

(10) Patent No.: US 12,332,736 B2
(45) Date of Patent: Jun. 17, 2025

(54) NETWORK MANAGEMENT APPARATUS, NETWORK MANAGEMENT METHOD AND NETWORK MANAGEMENT SYSTEM

(71) Applicant: RAKUTEN MOBILE, INC., Tokyo (JP)

(72) Inventors: Jayoung Oh, Tokyo (JP); Masaaki Kosugi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/788,820

(22) PCT Filed: Sep. 21, 2021

(86) PCT No.: PCT/JP2021/034521
§ 371 (c)(1),
(2) Date: Jun. 24, 2022

(87) PCT Pub. No.: WO2023/047450
PCT Pub. Date: Mar. 30, 2023

(65) Prior Publication Data
US 2024/0193033 A1 Jun. 13, 2024

(51) Int. Cl.
*G06F 11/00* (2006.01)
*G06F 11/07* (2006.01)
(Continued)

(52) U.S. Cl.
CPC ...... *G06F 11/0793* (2013.01); *H04L 41/0866* (2013.01); *H04L 41/40* (2022.05)

(58) Field of Classification Search
CPC ............. G06F 11/0793; H04L 41/0866; H04L 41/40
(Continued)

(56) References Cited

U.S. PATENT DOCUMENTS

2003/0149735 A1* 8/2003 Stark .................. H04L 9/40
714/4.11
2005/0193257 A1* 9/2005 Stoler ................ H04L 41/0681
714/31
2005/0278587 A1* 12/2005 Breitling ................ G06Q 10/00
714/48

(Continued)

FOREIGN PATENT DOCUMENTS

JP 10-289140 A 10/1998
JP 2001-034509 A 2/2001
(Continued)

*Primary Examiner* — Sarai E Butler
(74) *Attorney, Agent, or Firm* — Sughrue Mion, PLLC

(57) ABSTRACT

Disclosed herein is a network management apparatus, comprising: a correlating information storage unit configured to store correlating information that correlates an error that may occur when executing a workflow to a way of resolving the error, the workflow defining a series of network construction processes consisting of a plurality of processes; a log collection unit configured to collect logs related to executing the workflow; a workflow stop unit configured to stop executing the workflow when an error occurs during the workflow being executed; an error handling unit configured to, during the workflow being stopped, refer to the correlating information based on the logs and determine a handling dealing with the error to perform the handling; and a workflow resuming unit configured to resume, when the error is resolved by the handling, the workflow from a process corresponding to the handling among the plurality of processes.

11 Claims, 14 Drawing Sheets

(51) Int. Cl.
*H04L 41/0866* (2022.01)
*H04L 41/40* (2022.01)

(58) Field of Classification Search
USPC ........................................................ 714/1–57
See application file for complete search history.

(56) References Cited

U.S. PATENT DOCUMENTS

| | | | | |
|---|---|---|---|---|
| 2007/0260909 | A1* | 11/2007 | Archer | G06F 11/2007 714/E11.078 |
| 2008/0004841 | A1* | 1/2008 | Nakamura | G06F 11/008 702/182 |
| 2009/0210745 | A1* | 8/2009 | Becker | G06F 11/0706 714/26 |
| 2012/0324285 | A1* | 12/2012 | Li | G06F 12/16 714/20 |
| 2014/0019803 | A1* | 1/2014 | Busaba | G06F 11/1479 714/16 |
| 2014/0281684 | A1* | 9/2014 | Beckman | G06F 11/0721 714/6.11 |
| 2016/0170848 | A1* | 6/2016 | Yang | G06F 11/2023 714/4.12 |
| 2016/0378579 | A1* | 12/2016 | Zhao | G06F 11/0748 714/37 |
| 2017/0228297 | A1* | 8/2017 | Todoroki | G06F 11/1438 |
| 2017/0351570 | A1* | 12/2017 | Laity | G11C 29/4401 |
| 2018/0024852 | A1 | 1/2018 | Yabushita et al. | |
| 2020/0278908 | A1* | 9/2020 | Schaefer | G11C 7/1018 |

FOREIGN PATENT DOCUMENTS

| | | |
|---|---|---|
| JP | 2001-094559 A | 4/2001 |
| JP | 2010-176303 A | 8/2010 |
| WO | 2016/121802 A1 | 8/2016 |

* cited by examiner

FIG. 8

| ERROR ID | KEYWORD | ERROR RESOLUTION CODE | AUTO-RUN FLAG |
|---|---|---|---|
| 10000001 | timeout | 01 | true |
| 10000002 | image onboarding failed | 03 | false |
| 10000003 | Patch failed | 05 | false |

| ERROR RESOLUTION CODE | WAY OF RESOLVING ERROR | STEP CODE | HW / SW |
|---|---|---|---|
| 01 | RETRY | 003 | SW |
| 02 | REPLACE HOUSING | 001 | HW |
| 03 | MANUAL ONBOARDING | 005 | SW |
| ... | ... | ... | ... |

412

NETWORK MANAGEMENT APPARATUS, NETWORK MANAGEMENT METHOD AND NETWORK MANAGEMENT SYSTEM

CROSS REFERENCE TO RELATED APPLICATIONS

This application is a National Stage of International Application No. PCT/JP2021/034521 filed Sep. 21, 2021.

TECHNICAL FIELD

The present invention relates to a network management apparatus, a network management method, and a network management system, and in particular to a technique for automating the construction of a mobile network.

BACKGROUND ART

With a background of improved performance of general-purpose servers and network infrastructures, cloud computing (hereinafter simply referred to as "cloud"), which on demand uses computing resources that are virtualized on physical resources such as servers, has become widely prevailing. In addition, the Network Function Virtualization (NFV), which virtualizes network functions and provides the virtualized network functions on the cloud, has been well known. The NFV is a technology that uses virtualization and cloud technologies to separate the hardware and software of various network services, which used to run on dedicated hardware, and to run the software on a virtualized infrastructure. It is expected to improve the sophistication of operations and reduce costs by use of those virtualization technologies.

In recent years, the virtualization has been advanced in mobile networks as well.

The European Telecommunications Standards Institute (ETSI) NFV defines the NFV architecture (see, for example, Patent Literature 1).

LISTING OF REFERENCES

Patent Literature

Pat. LITERATURE 1: International Publication of PCT International Patent Application No. WO2016/121802 A

SUMMARY OF THE INVENTION

Problems to be Solved by the Invention

Recent telecom networks are large-scale networks constructed on a virtualized infrastructure, and in such large-scale networks, there is a need for greater efficiency and automation in constructing networks.

Conventionally, when a certain problem occurred during the construction of a network, an operator would analyze the logs of a device that caused the problem and take action to deal with the problem or would request a relevant department (or person or company in charge) to analyze and deal with the problem. However, telecom networks are constituted with various components, and in many cases, a large number of departments (or people or companies) are working together to construct the network, making it difficult to expeditiously identify the cause of the problem and select where to request the analysis. When it takes considerable time to deal with a problem, the construction work would stop for a longer period of time, resulting in a longer overall construction time.

As mentioned above, conventionally, the construction of the network was time-consuming and human-cost intensive.

The present invention has been made in order to solve the above mentioned problems and an object thereof is to provide a network management apparatus, a network management method, and a network management system capable of shortening the overall time for construction and reducing human costs required to deal with errors in a large-scale network.

Solution to Problems

In order to solve the above mentioned problems, according to one aspect of the present invention, there is provided a network management apparatus, comprising: a correlating information storage unit configured to store correlating information that correlates an error that may occur when executing a workflow to a way of resolving the error, the workflow defining a series of network construction processes consisting of a plurality of processes; a log collection unit configured to collect logs related to executing the workflow; a workflow stop unit configured to stop executing the workflow when an error occurs during the workflow being executed; an error handling unit configured to, during the workflow being stopped by the workflow stop unit, refer to the correlating information stored by the correlating information storage unit based on the logs collected by the log collection unit and determine a handling to deal with the error to perform the handling; and a workflow resuming unit configured to resume, when the error is resolved by the handling performed by the error handling unit, the workflow from a process corresponding to the handling among the plurality of processes.

The error handling unit may refer to the correlating information stored in the correlating information storage unit based on the logs collected by the log collection unit, and determine whether or not it is possible to automatically perform handling processing to resolve an error that has occurred during the workflow being executed, and when it is determined to be possible to automatically perform the handling processing, perform the handling processing, while when it is determined to be not possible to automatically perform the handling processing, instructs an operator to perform a handling to resolve the error that has occurred.

The error handling unit may determine that it is not possible to automatically perform the handling processing when the handling processing is determined to require human intervention, and instruct the operator, as the handling, to perform the handling processing.

The error handling unit may determine that it is not possible to automatically perform the handling processing when there is no way of resolving the error that is correlated to the error that has occurred during the workflow being executed in the correlating information stored by the correlating information storage unit, and instruct the operator, as the handling, to analyze the error and perform the handling processing to resolve the error.

The correlating information storage unit may store, as the correlating information, information for identifying a process to be resumed by the workflow resuming unit, correlating the error and the way of resolving the error thereto.

The workflow resuming unit may resume the workflow from any one of a process to be performed first, a process in which the error has occurred, and a process following the process in which the error has occurred among the plurality of processes.

The error handling unit may analyze logs for a component related to the process in which the error has occurred among the logs collected by the log collection unit.

The error handling unit may perform no handling to deal with the error when the process in which the error has occurred is determined to be skippable, and the workflow resuming unit may resume the workflow from a process following the process in which the error has occurred among the plurality of processes.

The network management apparatus may further comprise: an errored process rerun unit configured to, after the workflow is resumed by the workflow resuming unit and the series of network construction processes are completed, perform the handling corresponding to the process in which the error has occurred and rerun the process in which the error has occurred, when the process in which the error has occurred is determined to be a skippable process and the error handling unit performs no handling to deal with the error.

According to another aspect of the present invention, there is provided a network management method performed by a network management apparatus, comprising steps of: acquiring correlating information that correlates an error that may occur when executing a workflow to a way of resolving the error, the workflow defining a series of network construction processes consisting of a plurality of processes; collecting logs related to executing the workflow; stopping executing the workflow when an error occurs during the workflow being executed; during the workflow being stopped, referring to the correlating information based on the logs and determining a handling to deal with the error to perform the handling; and resuming, when the error is resolved by performing the handling, the workflow from a process corresponding to the handling among the plurality of processes.

According to yet another aspect of the present invention, there is provided a network management system, comprising: a correlating information storage unit configured to store correlating information that correlates an error that may occur when executing a workflow to a way of resolving the error, the workflow defining a series of network construction processes consisting of a plurality of processes; a log collection unit configured to collect logs related to executing the workflow; a workflow stop unit configured to stop executing the workflow when an error occurs during the workflow being executed; an error handling unit configured to, during the workflow being stopped by the workflow stop unit, refer to the correlating information stored by the correlating information storage unit based on the logs collected by the log collection unit and determine a handling to deal with the error to perform the handling; and a workflow resuming unit configured to resume, when the error is resolved by the handling performed by the error handling unit, the workflow from a process corresponding to the handling among the plurality of processes.

Advantageous Effect of the Invention

According to the present invention, it makes it possible to shorten the overall time for construction and reduce human costs required to deal with errors in a large-scale network.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 8 is a schematic diagram illustrating an exemplary list of known problems.

FIG. 9 is a schematic diagram illustrating an exemplary list of ways of resolving errors.

DESCRIPTION OF EMBODIMENTS

Figure 1:
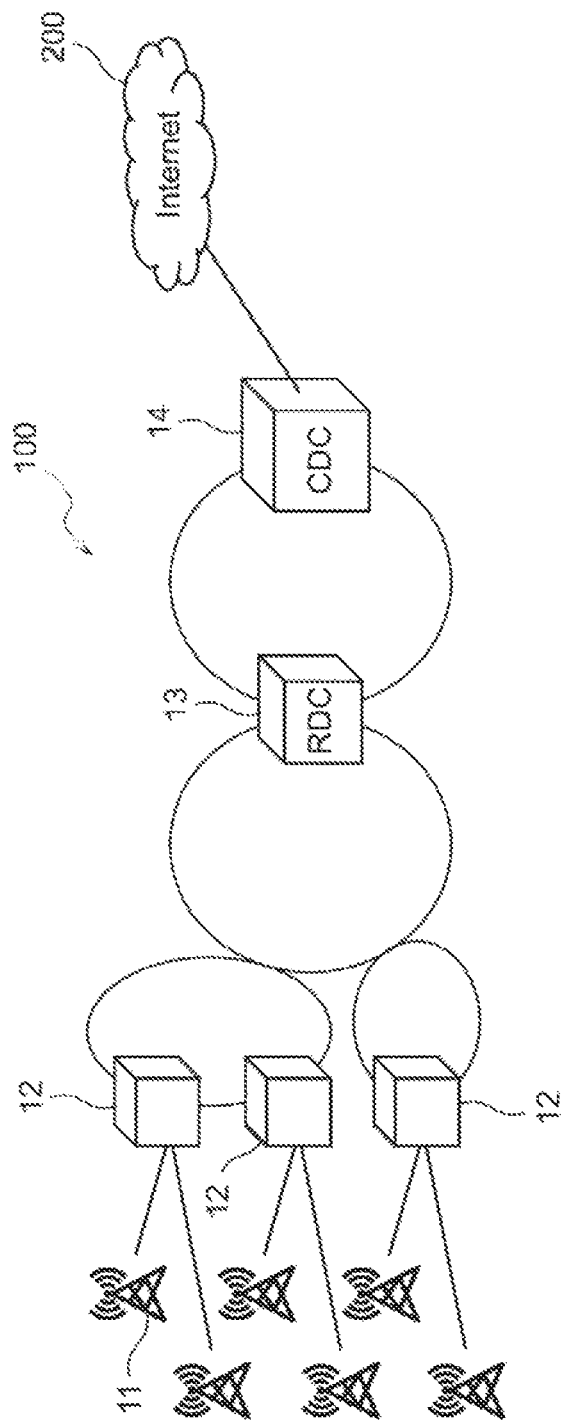
FIG. 1 is a conceptual diagram illustrating an exemplary network configuration of a mobile network including a network management apparatus according to the present embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a network management apparatus according to the present embodiment has a network management function that automatically performs network construction processing in a mobile network constructed on a virtualized infrastructure.

More particularly, the network management apparatus executes a workflow that defines a series of network construction processes consisting of a plurality of processes. When an error occurs during the execution of the workflow, the network management apparatus stops executing the workflow and performs handling to deal with the error, and when the error is resolved, the network management apparatus resumes the workflow from a process corresponding to the handling performed among the plurality of processes.

Here, the above network construction processes include configuring network devices (e.g., switches or the like), configuring hardware of a virtualization platform, configuring software of the virtualization platform, and application settings.

More particularly, the network management apparatus collects logs related to executing a workflow during the execution of the workflow, and when an error occurs and the workflow is stopped, the network management apparatus determines a handling to deal with the error and performs the determined handling based on the collected logs. At this time, the network management apparatus refers to correlating information that correlates in advance errors that may occur when executing the workflow to ways of resolving errors, respectively, to determine and perform the handling to deal with the error concerned.

The network management apparatus refers to the above correlating information to determine whether or not it is possible to automatically perform handling processing to resolve the error, and when it is determined to be possible to automatically perform the handling processing, the network management apparatus automatically performs the handling processing so as to resolve the error.

On the other hand, when it is determined to be not possible to automatically perform the handling processing, the network management apparatus instructs an operator (hereinafter also referred to as "user") to take action to resolve the error. Here, the network management apparatus is able to determine that it is not possible to automatically perform the handling processing when human intervention is required to resolve the error or when a certain handling processing to resolve the error has not yet been established.

FIG. 1 is a conceptual diagram illustrating an exemplary network configuration of a mobile network 100 including a network management apparatus according to the present embodiment.

In the mobile network 100 shown in FIG. 1, a mobile communicable terminal such as a smartphone and the Radio Access Network (RAN) communicate with each other wirelessly, and the transmitted information is relayed through the backhaul network (i.e., Mobile Backhaul: MBH) to the core network for processing. This allows the mobile communicable terminal to connect to the Internet 200 or connect to another company's network to make voice calls, or the like.

More particularly, the mobile network 100 includes base stations 11 and a plurality of accommodating stations 12 to 14. In FIG. 1, the accommodating station 12 is an edge data center, the accommodating station 13 is a Regional Data Center (RDC), and the accommodating station 14 is a Central Data Center (CDC). A backhaul network is constituted between the edge data center 12 and the central data center 14.

The mobile network 100 according to the present embodiment is a virtualized network constructed on a virtualization infrastructure. The mobile network 100 realizes everything from the switching equipment of the backbone network to the radio access functions of the base stations by software on general-purpose servers.

The base station 11 is equipped with an antenna, a switchboard, a battery, and the like.

The edge data center 12 is located near the base stations 11 and is connected to a plurality of base stations 11 via fiber-optic cables, or the like. The edge data center 12 realizes the RAN-related radio access functions.

The regional data center 13 is connected to a plurality of edge data centers 12. The regional data center 13 realizes, by software, the firewall/NAT (Network Address Translation), the CDN (Content Distribution Network), and various applications for edge computing.

The central data center 14 is connected to a plurality of regional data centers 13. The central data center 14 realizes core functions such as the EPC (Evolved Packet Core), the IMS (IP Multimedia Subsystem), or the like.

It should be noted that the number of respective data centers (i.e., accommodating stations), that is, the edge data center 12, the regional data center 13, and the central data center 14, is not limited to the number shown in FIG. 1. For example, although only one regional data center 13 and one central data center 14 are shown in FIG. 1, there may be a plurality of regional data centers 13 and central data centers 14, respectively.

Figure 2:
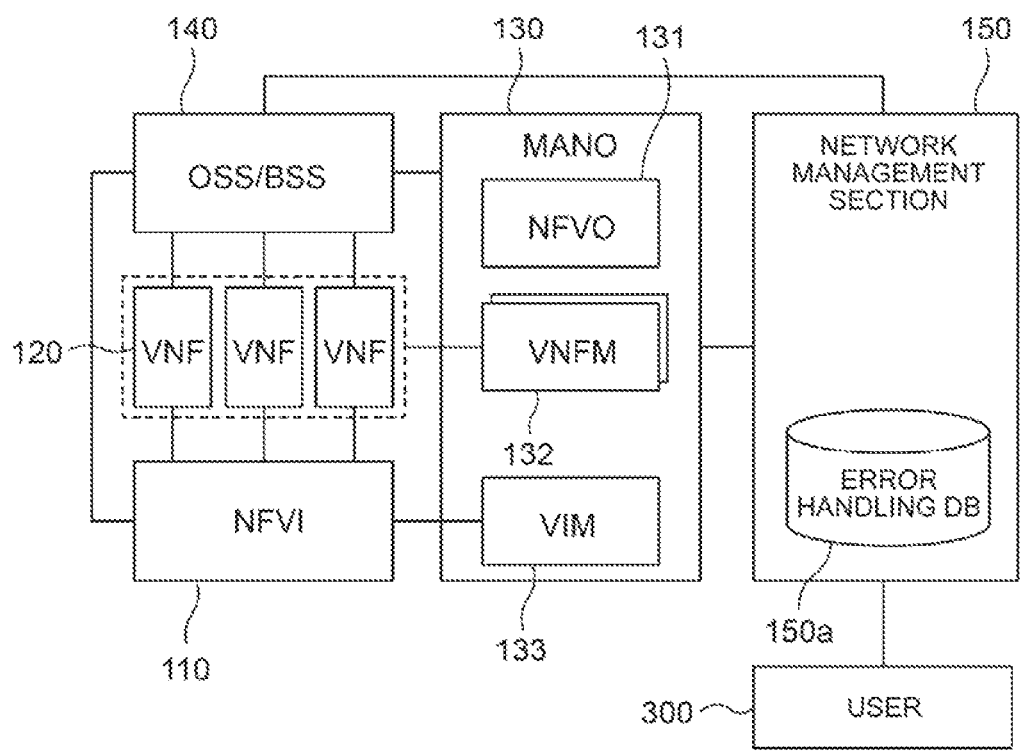
FIG. 2 is a block diagram illustrating an exemplary internal configuration of a network management system.

FIG. 2 is a block diagram illustrating an exemplary internal configuration of a network management system that constitutes the mobile network 100.

Each of constituent elements shown in FIG. 2 has a reference point. The lines connecting the constituent components shown in FIG. 2 indicate that connected constituent elements via the line can send and receive information from each other.

The NFVI (NFV Infrastructure) 110 is a network function virtualization infrastructure, and includes physical resources, a virtualization layer, and virtualized resources. The physical resources include hardware resources such as computing resources, storage resources, and transmission resources. The virtualization layer is a virtualizing layer such as a hypervisor for virtualizing the physical resources and providing the virtualized physical resources to the VNF (Network Function Virtualization) 120. The virtualized resources are the virtualized infrastructure resources provided to the VNF 120.

In other words, the NFVI 110 is an infrastructure that enables flexible handling of hardware resources of physical servers (hereinafter also simply referred to as "servers"), such as computing, storage, and network functions, as virtualized hardware resources such as virtualized computing, virtualized storage, and virtualized network, which are virtualized by the virtualization layer such as the hypervisor.

A plurality of servers that constitute the NFVI 110 are grouped together and deployed in each of the data centers 12 to 14. The number, the placement positions, wiring, and the like, of the servers to be deployed in each of the data centers 12 to 14 are predetermined depending on the type of data center (i.e., accommodating station type). In each of the data centers 12 to 14, the deployed servers are connected by an internal network and are capable of sending and receiving information from each other. In addition, the data centers are connected to each other by a network, and the servers in different data centers are capable of sending and receiving information from each other via the network.

The VNF 120 corresponds to applications running on virtual machines (VMs) on the servers and implements the network functions by software. Although not specifically shown, each VNF 120 may be provided with a management function called an EM (Element Manager).

The NFVI 110 and the VNF 120 in FIG. 2 constitute the virtualized environment. In other words, the virtualized environment is constituted with three layers, in order from the lower layer: the hardware, the virtualization layer, and virtual machines.

The MANO (Management and Orchestration) 130 has management and orchestration functions for the virtualized environment. The MANO 130 includes the NFVO (NFV-Orchestrator) 131, the VNFM (VNF-Manager) 132, and the VIM (Virtualized Infrastructure Manager) 133.

The NFVO 131 orchestrates the NFVI resources, manages the lifecycle of network services, and provides integrated operational management of the entire system. The NFVO 131 is capable of performing processing in response to instructions from the OSS/BSS (Operation Support System/Business Support System) 140, which will be described below.

The VNFM 132 manages the lifecycle of each of the VNFs 120. It should be noted that the VNFM 132 may be arranged in the MANO 130 as a dedicated VNFM corresponding to each of VNFs 120. Alternatively, a single VNFM 132 may manage the lifecycle of two or more VNFs 120. In this case, the VNFM 132 may be a general-purpose VNFM that supports VNFs 120 provided by different vendors.

The VIM 133 performs operational management of the resources of the VNFs 120.

The OSS/BSS 140 is an integrated management system for the mobile network 100.

Here, the OSS is a system (i.e., equipment, software, mechanism, and the like) necessary for constructing and operating the desired services, and the BSS is an information system (i.e., equipment, software, mechanism, and the like) used for billing, invoicing, and customer services.

The network management section 150 realizes the network management function in which the network management section 150 executes a workflow that defines a series of network construction processes consisting of a plurality of processes, and when an error occurs during the execution of the workflow, the network management section 150 stops executing the workflow, performs the handling to deal with the error, and resumes the workflow from a process corresponding to the handling performed. The network management section 150 may constitute the network management apparatus according to the present embodiment.

The network management section 150 is equipped with an error handing database ("error handling DB") 150a. When an error occurs during the execution of a workflow, the network management section 150 refers to the error handling database 150a based on logs related to executing the workflow and determines the handling corresponding to the error concerned to perform the handling determined.

The error handling database 150a serves as a correlating information storage unit that correlates errors, which may occur when executing the workflow, to ways of resolving errors, respectively. The error handling database 150a may store the correlating information on actual errors that previously occurred and possible errors that may occur in the future.

It should be noted that the error handling database 150a may be constituted with a volatile or nonvolatile memory or the like that acquires the above correlating information from outside and temporarily stores the acquired correlating information. In this case, the timing for acquiring the correlating information is not particularly limited.

Furthermore, the network management section 150 is not limited to being an external function of the OSS/BSS 140 or the MANO 130 as shown in FIG. 2. The network management section 150 may be provided inside the OSS/BSS 140, or alternatively inside the MANO 130. In this case, the network management function of the network management section 150 is a part of the functions of the OSS/BSS 140 or the MANO 130.

Figure 3:
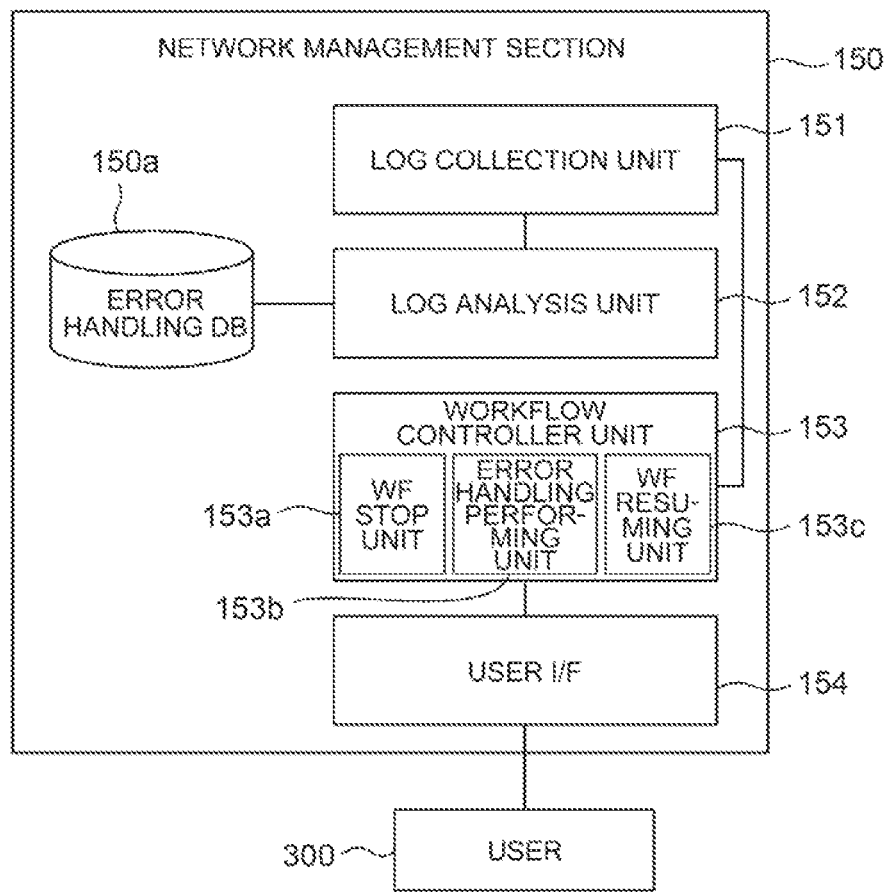
FIG. 3 is a block diagram illustrating an exemplary functional configuration of a network management section according to the present embodiment.

FIG. 3 is a block diagram illustrating an exemplary functional configuration of the network management section 150.

As shown in FIG. 3, the alert analysis section 150 includes a log collection unit 151, a log analysis unit 152, workflow controller unit 153, and a user interface ("user/F") 154. The workflow controller unit 153 includes a workflow stop unit ("WF stop unit") 153a, an error handling performing unit 153b, and a workflow resuming unit ("WF resuming unit") 153c. The network management section 150 is also equipped with the error handling database ("error handling DB") 150a.

The log collection unit 151 collects logs relating to executing workflows. When a workflow is executed, the OSS 140, for example, may issue a command to the VNFM 132 or the VIM 133 to perform processes defined in the workflow in sequence. In this case, the log collection unit 151 may collect logs directly from the VNFM 132 or the VIM 133, or alternatively, via the MANO 130 or the OSS 140.

When an error occurs during the execution of a workflow, the log analysis unit 152 refers to the error handling database 150a based on the logs collected by the log collection unit 151, and determines whether or not it is possible to automatically perform the handling processing to resolve the error concerned.

The workflow stop unit 153a of the workflow controller unit 153 stops the workflow being executed, for example, according to a request to stop from the OSS 140. The OSS 140 may determine whether or not an error has occurred based on the logs collected by the log collection unit 151 during the execution of the workflow, and when the error is determined to be occurring, the OSS 140 may send a request to stop the workflow to the workflow controller unit 153. It should be noted that the workflow controller unit 153 may alternatively determine whether or not an error has occurred during the execution of the workflow.

When an error has occurred during the execution of a workflow and the workflow stop unit 153a has stopped the workflow, the error handling performing unit 153b determines the handing to deal with the error based on the analysis results by the log analysis unit 152.

When the error is resolved by the handling performed by the error handling performing unit 153b, the workflow resuming unit 153c resumes the workflow. At this time, the workflow resuming unit 153c resumes the workflow from a process corresponding to the handling performed by the error handling performing unit 153b.

More particularly, the workflow resuming unit 153c may resume the workflow from, among a plurality of processes, any of followings: a process to be performed first; a process in which the error has occurred; and a process following the process in which the error has occurred.

The user interface 154 is an input/output device that is operable by a user and may include a pointing device such as a keyboard or a mouse, a monitor, and a speaker.

It should be also noted that the configuration of the functional blocks of the network management section 150 shown in FIG. 3 is no more than exemplary, and multiple functional blocks may constitute a single functional block, or any of the functional blocks may be divided into multiple blocks that perform multiple functions. For example, the log analysis unit 152 and the error handling performing unit 153b may constitute an error handling unit serving as a single functional flock that refers to the error handling database 150a based on the logs collected by the log collection unit 151 and determines the handling to deal with the error that has occurred to perform the handling determined during the workflow being stopped by the workflow stop unit 153a.

In addition, the multiple functions of the network management section 150 may be divided into the external functions of the OSS/BSS 140 or the MANO 130, and the internal functions of the OSS/BSS 140 or the MANO 130 of the network management system shown in FIG. 2.

Figure 4:
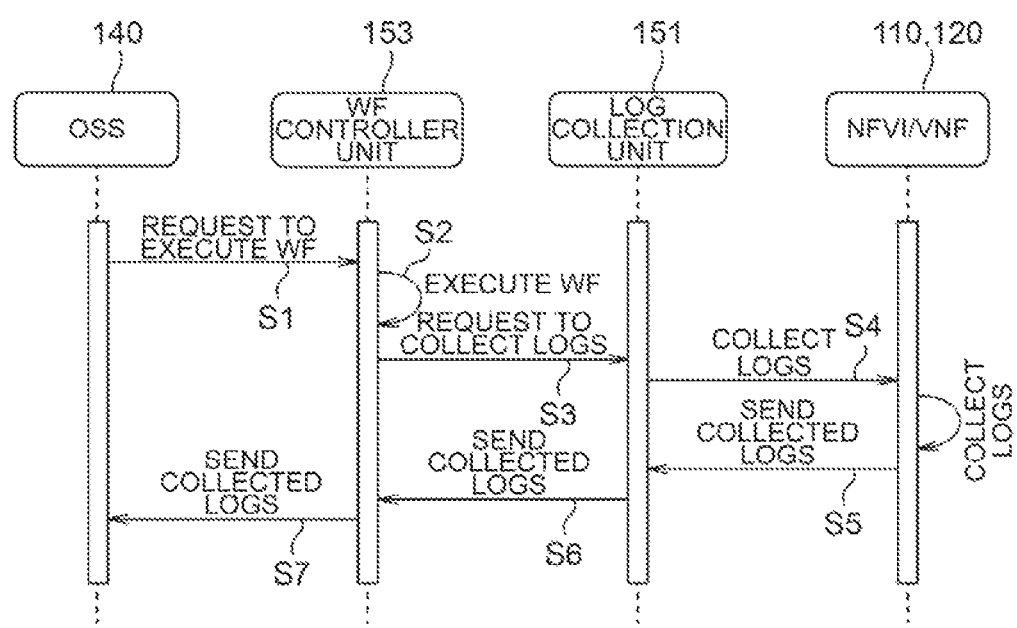
FIG. 4 is a sequence chart illustrating an exemplary operation of workflow execution processing.

FIG. 4 is a sequence chart illustrating an exemplary operation during the execution of a workflow.

First, in step S1, the OSS 140 sends a request to execute a workflow to the workflow controller unit ("WF controller unit") 153 to instruct the workflow controller unit 153 to execute the workflow.

Subsequently, in step S2, the workflow controller unit 153 starts executing the workflow, and in step S3, the workflow controller unit 153 sends a request to collect logs to the log collection unit 151.

In step S4, the log collection unit 151 requests the NFVI 110 or the VNF 120 to send logs related to executing the workflow. In step S5, the log collection unit 151 acquires the collected logs sent from the NFVI 110 or the VNF 120 and sends the collected logs acquired to the workflow controller unit 153.

In step S6, the workflow controller unit 153 acquires the collected logs from the log collection unit 151 and sends the collected logs to the OSS 140. In step S7, the OSS 140 acquires the collected logs from the workflow controller unit 153.

The OSS 140 is able to analyze the collected logs acquired to determine whether or not an error has occurred during the execution of the workflow. When the OSS 140 determines that an error is occurring during the execution of a workflow, the OSS 140 may send a request to stop the workflow to the workflow controller unit 153. At this time, the OSS 140 may notify the workflow controller unit 153 that the error has occurred, including information indicating which step of the workflow has caused the error into an error notification.

It should be noted that the log collection unit 151 is not limited to the case in which the log collection unit 151 collects logs directly from the NFV 110 or the VNF 120, as shown in FIG. 4. As described above, the log collection unit 151 may alternatively collect logs via the MANO 130 or the OSS 140 from the NFVI 110 or the VNF 120.

Figure 5:
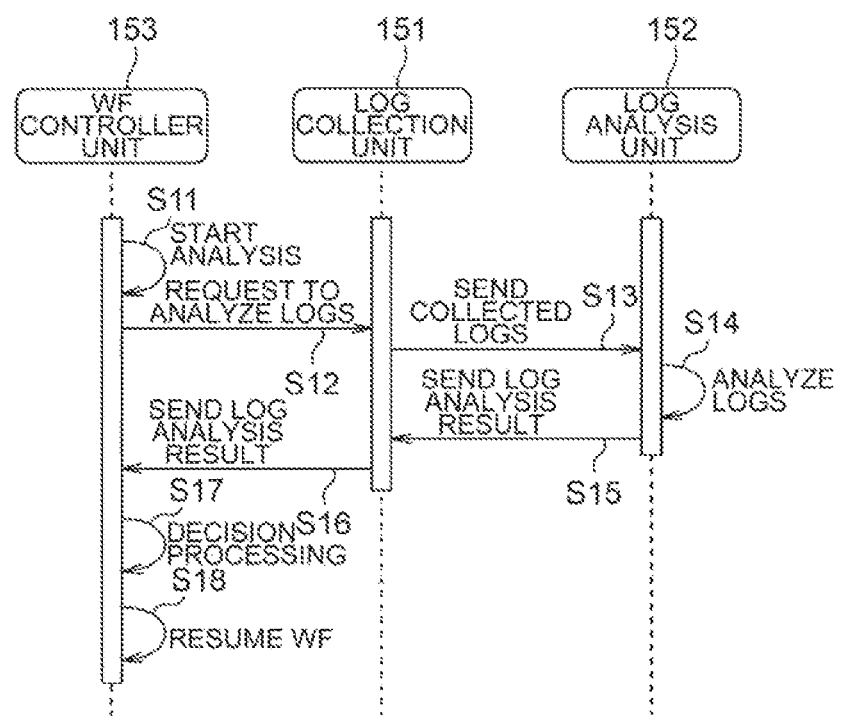
FIG. 5 is a sequence chart illustrating an exemplary operation in case that an automatic resume is possible.

FIG. 5 is a sequence chart illustrating an exemplary operation after an error occurs during a workflow being executed and the workflow is stopped by the workflow stop unit 153a.

In the following description, a certain example will be described in which the network construction processes for the edge data center 12 are performed. It should be noted that, in the following description, the edge data center is referred to as a Group unit Center (GC) in order to distinguish the edge data center 12 from other types of data centers.

When the workflow is stopped, first, in step S11, the workflow controller unit ("WF controller unit") 153 starts a workflow for log analysis to deal with the error concerned.

Subsequently, in step S12, the workflow controller unit 153 sends a request to analyze logs (hereinafter also referred to as "log analysis request") to the log collection unit 151. The log analysis request includes workflow information 401 shown in FIG. 6.

Figure 6:
FIG. 6 is a schematic diagram illustrating an exemplary structure of workflow information that the workflow controller unit forwards to the log collection unit.

The workflow information 401 may include, as shown in FIG. 6, an analysis ID, a GC name of the network construction target ("GC name"), a GC code, a step number in which a process has failed ("Failed step code"), and a workflow ID ("WF ID") in which the process has failed. The workflow controller unit 153 may acquire information constituting the workflow information 401 from the OSS 140 along with the request to stop the workflow.

Referring back to FIG. 5, in step S13, the log collection unit 151 sends the collected logs to the log analysis unit 152. The collected logs sent at this time may be logs collected for a certain component related to the process in which the error has occurred. Based on the information included in the workflow information 401 shown in FIG. 6, the log collection unit 151 may select a log or logs collected for the component related to the process in which the error has occurred, and send the selected logs to the log analysis unit 152.

Figure 7:
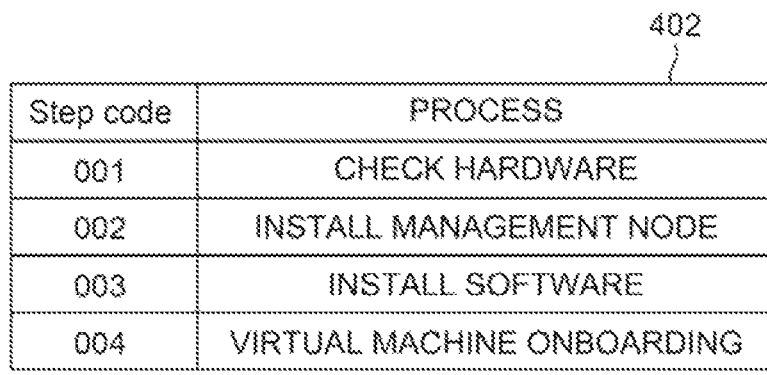
FIG. 7 is a schematic diagram illustrating exemplary processes defined in a workflow.

More particularly, the log collection unit 151 may refer to a list of processes 402 shown in FIG. 7 based on the "Failed step code" included in the workflow information 401, to check the content of the process in which the error has occurred, and select, as the target logs to be analyzed, logs collected for the component related to the process concerned. For example, when the process in which the error has occurred is a hardware-related process, the logs related to the hardware may be selected as the target logs to be analyzed.

It should be noted that the list of processes 402 may be prepared for each workflow. In this case, the log collection unit 151 may use the "WF ID" included in the workflow information 401 to refer to the list of processes 402 that corresponds to the workflow in which the error has occurred.

In addition, the present embodiment is not limited to the case in which the log collection unit 151 refers to the list of processes 402. For example, alternatively, the workflow controller unit 153 may refer to the list of processes 402, and send information including the content of the process concerned shown in FIG. 7 to the log collection unit 151.

Referring back to FIG. 5, in step S14, the log analysis unit 152 analyzes the collected logs received from the log collection unit 151 by referring to a list of known problems (i.e., "known issue list") 411 shown in FIG. 8, and determines whether or not it is possible to automatically perform the handling processing to resolve the error concerned. The known issue list 411 is a list of known problems for which ways of resolving error have been established, respectively, and is stored in the error handling database 150a.

The known issue list 411 may include an error ID, a keyword, an error resolution code, and an auto-run flag, as shown in FIG. 8.

The keyword is a keyword of an error included in the logs. It should be noted that keywords shown in FIG. 8 are no more than exemplary and may be more detailed keywords. For example, when the keyword is "timeout," the keyword may describe more specific details, such as identifying between which components the timeout has occurred.

The auto-run flag is a flag indicating whether or not it is possible to automatically perform the handling processing to resolve the error, and the value of "true" indicates that it is possible to automatically perform the handling processing, while the value of "false" indicates that it is not possible to automatically perform the handling processing.

In step S14, the log analysis unit 152 searches the known issue list 411 using the collected logs received from the log collection unit 151 as a key.

When the corresponding record exists in the known issue list 411, in step S15, the log analysis unit 152 sends to the log collection unit 151 the log analysis results, which include the error resolution code and the auto-run flag in the corresponding record. On the other hand, when the corresponding record does not exist in the known issue list 411, in step S15, the log analysis unit 152 sends to the log collection unit 151 the log analysis results, which include information indicating that the corresponding record does not exist in the known issue list 411.

The known issue list 411 may be prepared for each workflow, since errors that may occur and the ways of resolving errors may differ depending on the workflow.

In step S16, the log collection unit 151 sends the log analysis results received from the log analysis unit 152 straightforwardly to the workflow controller unit 153.

In step S17, the workflow controller unit 153 determines, based on the log analysis results received from the log collection unit 151, whether or not the error that has occurred is a known problem, for which a way of resolving the error has been established, or an unknown problem, for which a way of resolving the error has not yet been established. When the error that has occurred is determined to be the known problem, the workflow controller unit 153 further performs the decision processing to determine whether or not it is possible to automatically perform the handling processing to resolve the error. Subsequently, the workflow controller unit 153 performs the handling to deal with the error according to the results of the decision processing.

For example, when the collected logs sent from the log collection unit 151 to the log analysis unit 152 in step S13 include the error key word "timeout", the log analysis unit 152 includes in the log analysis results the error resolution code (01) and the auto-run flag (true) included in the record having the error ID=10000001 in FIG. 8 and sends the log analysis results to the log collection unit 151. The workflow controller unit 153, which has received the log analysis results from the log collection unit 151, determines that the error that has occurred is the known problem for which the way of resolving the error has been established, and that it is possible to automatically perform the handling processing to resolve the error.

Therefore, in step S18, the workflow controller unit 153 automatically performs the handling processing and resumes the workflow.

At this time, the workflow controller unit 153 refers to the list of ways of resolving errors 412 shown in FIG. 9 to confirm the way of resolving the error concerned, and automatically performs the corresponding handling processing. As shown in FIG. 9, the list of ways of resolving errors 412 may include an error resolution code, a way of resolving error, a resuming step number ("step code"), which identifies from which process the workflow is to be resumed when resuming the workflow, and information indicating whether the error occurred is caused due to the hardware ("HW") problem or the software ("SW") problem. Here, the error resolution codes in the list of ways of resolving errors 412 correspond to the error resolution codes in the known issue list 411 shown in FIG. 8.

When the workflow controller unit 153 receives the log analysis results including the error resolution code=01 as in the example above, the workflow controller unit 153 is able to confirm, based on the list of ways of resolving errors 412 shown in FIG. 9, that an applicable way of resolving error is "retry".

In this case, in step S18, the workflow controller unit 153 performs a retry of the workflow. In other words, the workflow controller unit 153 resumes the workflow. At this time, the workflow controller unit 153 refers to the list of ways of resolving errors 412 shown in FIG. 9 to check the resuming step number corresponding to the error resolution code included in the log analysis results, and resumes the workflow from the process of the resuming step number concerned.

In this way, when it is possible to automatically perform the handling processing to resolve the error, the workflow is automatically resumed after automatically performing the handling processing.

Although a certain case in which the way of resolving error that can be automatically performed is "retry" is described here, the way of resolving error that can be automatically performed is not limited to the above. As long as the way of resolving error is the handling processing that does not require human intervention, the workflow controller unit 153 is able to automatically perform the handling processing and then automatically resume the workflow.

After the workflow is automatically resumed, similarly to step S3 in FIG. 4, the workflow controller unit 153 sends a request to collect logs to the log collection unit 151 to resume collecting logs.

Next, an operation will be described when it is not possible to automatically perform the handling processing to resolve an error.

According to the present embodiment, it is determined to be not possible to automatically perform the handling processing to resolve an error when the error that has occurred is an unknown problem, in other words, when there is no way of resolving error corresponding to the error that has occurred in the known issue list 411, or when there is a way of resolving error but the found way of resolving error is the handling processing that mandatorily requires human intervention.

Figure 10:
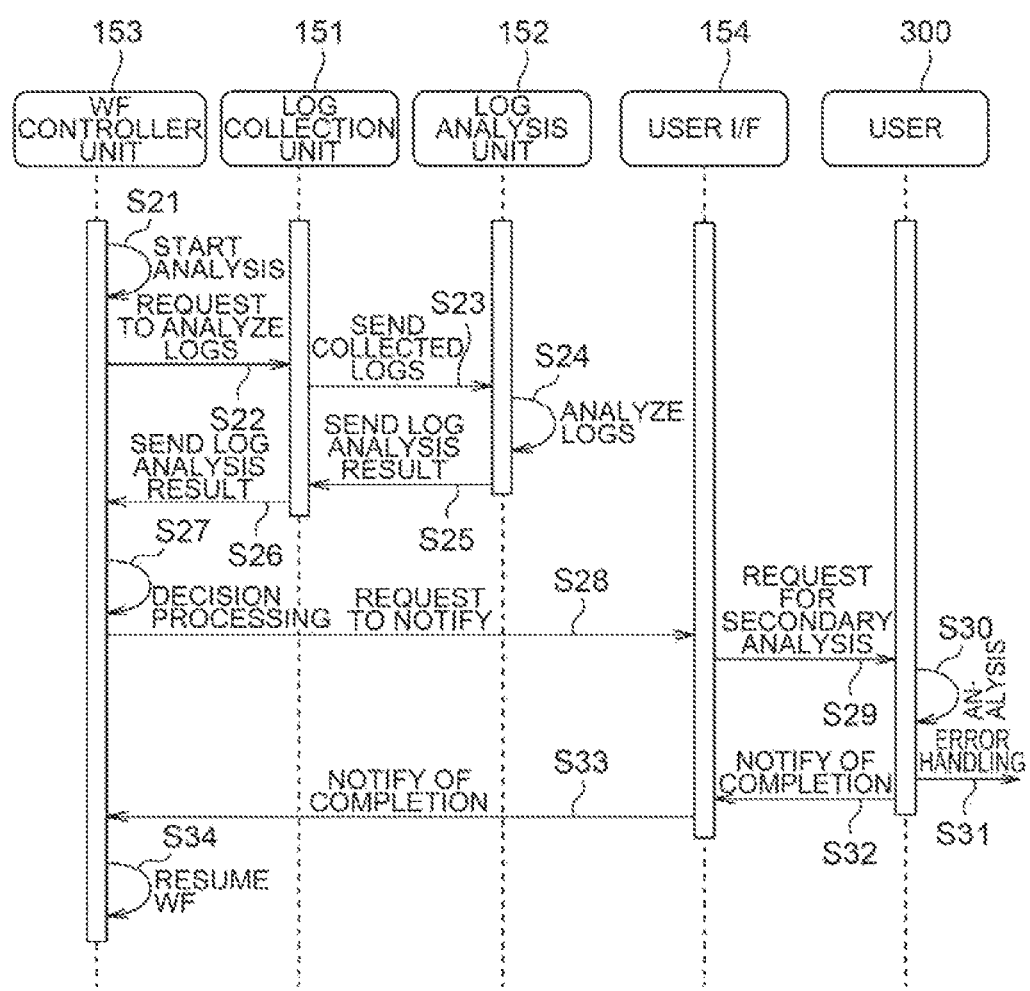
FIG. 10 is a sequence chart illustrating an exemplary operation in case that a request for secondary analysis to users is required.

FIG. 10 is a sequence chart illustrating an exemplary operation when the error that has occurred is an unknown problem. Referring to FIG. 10, processes in steps S21 to S26 are similar to processes in steps S11 to S16 in FIG. 5.

For example, errors that have never occurred previously or errors that have occurred previously but for which no way of resolving error has been established are not registered in the known issue list 411, and thus no corresponding record exists in the known issue list 411.

Therefore, in step S26, the workflow controller unit 153 receives the log analysis results including information indicating that there are no records corresponding to the error that has occurred in the known issue list 411 from the log collection unit 151.

Subsequently, in step S27, the workflow controller unit 153 determines that the error that has occurred is an unknown problem for which a way of resolving error has not been established and that it is not possible to automatically perform the handling processing to resolve the error.

Yet subsequently, in step S28, the workflow controller unit 153 sends, to the user IF 154, a request for secondary analysis that includes a request to a user 300 to analyze the error and an instruction to perform the handing or take action to resolve the error. In step S29, a user 300 confirms the request for secondary analysis via the user I/F 154.

As a result, it allows the user 300 to analyze the error in step S30 and to perform the error handling or take action in step S31. After the handling is performed, the user 300 sends, via the user I/F 154, a completion notification indicating that performing the handling is completed to the workflow controller unit 153 in steps S32 and S33.

When the workflow controller unit 153 receives the completion notification, the workflow controller unit 153 resumes the workflow in step S34. For example, a user 300 may include information to identify the process to be resumed into the completion notification and send the completion notification, and the workflow controller unit 153 may resume the workflow based on the information included in the completion notification. It should be noted that, alternatively, the workflow controller unit 153 may resume the workflow from the process to be performed first among a plurality of processes defined in the workflow without awaiting an instruction from a user 300.

Figure 11:
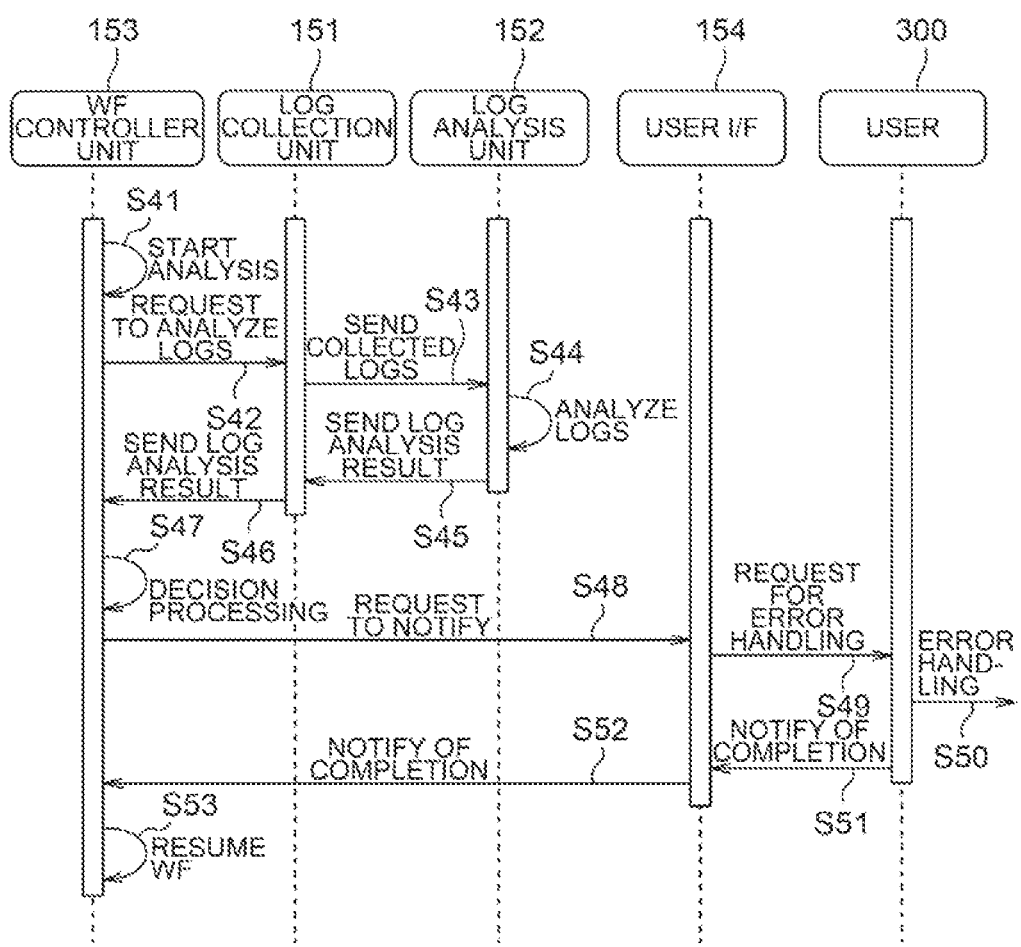
FIG. 11 is a sequence chart illustrating an exemplary operation in case that a request for error handling to users is required.

FIG. 11 is a sequence chart illustrating an exemplary operation when the error that has occurred is a known problem but requires a handling processing that requires human intervention. Referring to FIG. 11, processes in steps S41 to S46 are similar to processes in steps S11 to S16 in FIG. 5.

For example, w % ben an error such as a hardware malfunction occurs during a workflow being executed, it requires an appropriate handling that requires human intervention, such as hardware repair or replacement, and thus it is not possible to automatically perform the handling processing.

Therefore, in step S46, the workflow controller unit 153 receives from the log collection unit 151 the log analysis results that includes the error resolution code and the auto-run flag ("false") both of which are retrieved from the known issue list 411.

Subsequently, in step S47, the workflow controller unit 153 determines that the error that has occurred is a known problem, for which way of resolving error has been established, but it is not possible to automatically perform the handling processing to resolve the error.

Then, in step S48, the workflow controller unit 153 sends, to the user I/F 154, a request for error handling (i.e., action notification) that includes an instruction to a user 300 to take an action to resolve the error. In step S49, a user 300 confirms the request for error handling via the user I/F 154.

As a result, it allows the user 300 to perform the error handling or take action in step S50. After the handling is performed, the user 300 sends, via the user I/F 154, a completion notification indicating that performing the handling is completed to the workflow controller unit 153 in steps S51 and S52.

When the workflow controller unit 153 receives the completion notification, the workflow controller unit 153 resumes the workflow in step S53. At this time, the workflow controller unit 153 refers to the list of ways of resolving errors 412 in FIG. 9 to check the resuming step number corresponding to the error resolution code included in the log analysis results, and resumes the workflow from the process having the resuming step number concerned.

In this way, when it is not possible to automatically perform the handling processing to resolve the error, the workflow controller unit 153 awaits until performing the handling by the user 300 is completed, and then resumes the workflow.

Figure 12:
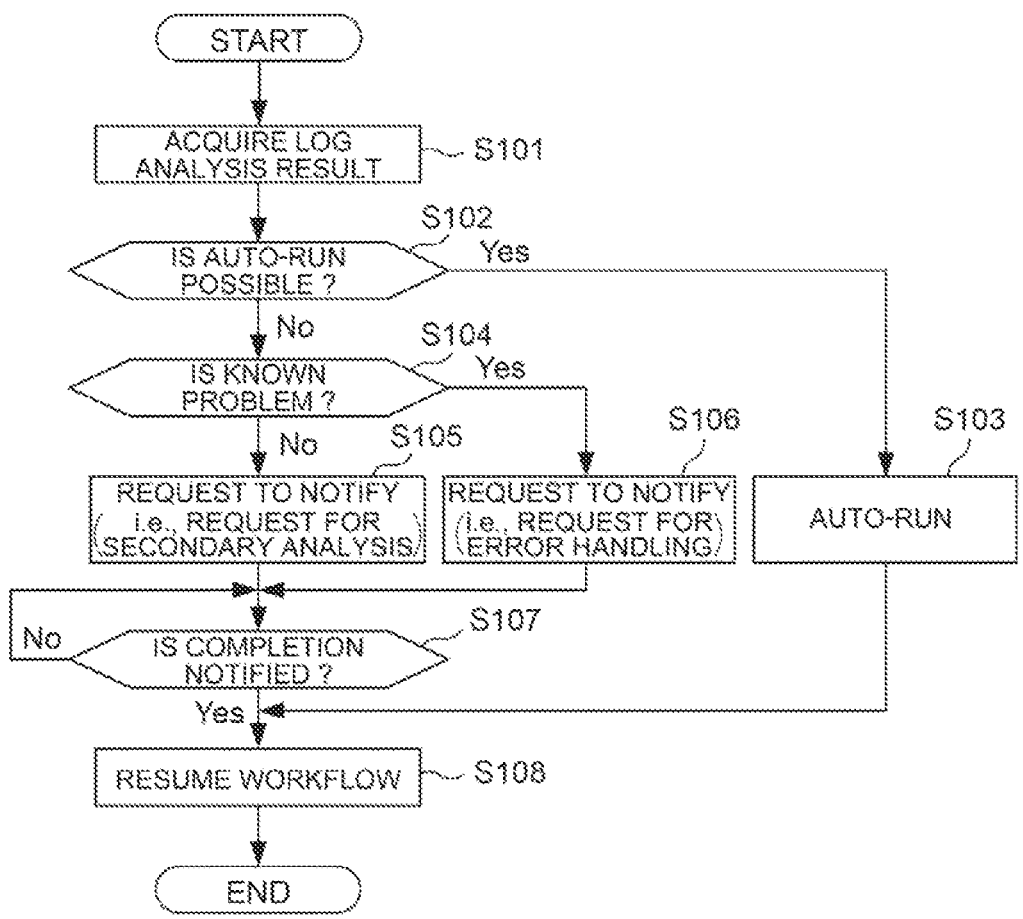
FIG. 12 is a flowchart illustrating an exemplary processing procedure of a part of operations performed by the workflow controller unit.

Hereinafter, a certain operation performed by the workflow controller unit 153 will be described after the workflow controller unit 153 has received the log analysis results with reference to the flowchart shown in FIG. 12. The processing shown in FIG. 12 corresponds to steps S17 and S18 in FIG. 5, steps S27 to S34 in FIG. 10, and steps S47 to S53 in FIG. 11, respectively.

First, in step S101, the workflow controller unit 153 acquires the log analysis results, and the processing proceeds to step S102.

In step S102, the workflow controller unit 153 determines whether or not it is possible to automatically perform (i.e., auto-run) the handling processing to resolve the error based on the auto-run flag included in the log analysis results acquired in step S101. More particularly, when the auto-run flag is "true", the workflow controller unit 153 determines that it is possible to automatically perform the handling processing, and the processing proceeds to step S103. On the other hand, when the auto-run flag is "false", the workflow controller unit 153 determines that it is not possible to automatically perform the handling processing, and processing proceeds to step 104.

In step S103, the workflow controller unit 153 refers to the list of ways of resolving errors in FIG. 9 based on the error resolution code included in the log analysis results to confirm the way of resolving the error concerned, and automatically perform (i.e., auto-run) the handling processing. After the workflow controller unit 153 automatically performs the handling processing, the processing proceeds to step S108.

In step S104, the workflow controller unit 153 determines whether the error that has occurred is a known problem or an unknown problem based on the log analysis results.

Subsequently, when the workflow controller unit 153 determines that the error that has occurred is an unknown problem in step S104, the processing proceeds to step S105, and the workflow controller unit 153 sends to the user I/F 154 the request for secondary analysis to a user 300, and the processing proceeds to step S107.

On the other hand, when the workflow controller unit 153 determines that the error that has occurred is a known problem in step S104, the processing proceeds to step S106, and the workflow controller unit 153 sends to the user I/F 154 the request for handling the error to a user 300, and the processing proceeds to step S107.

In step S107, the workflow controller unit 153 determines whether or not a completion notification has been received from the user 3X) via the user I/F 154, and awaits until the completion notification is received, and upon receipt of the completion notification, the processing proceeds to step S108.

In step S108, the workflow controller unit 153 resumes the workflow which has been stopped.

When the workflow is resumed, the workflow controller unit 153 resumes the workflow from the process corresponding to the handling performed or the action taken to deal with the error that has occurred.

More particularly, the workflow controller unit 153, depending on the handling performed or the action taken, resumes the workflow from, among a plurality of processes defined in the workflow, any of the following processes: a process to be performed first; a process in which an error has occurred; and a process following the process in which an error has occurred.

For example, assuming that, as the handling to deal with an error, a housing of the management node (i.e., management server) described below is replaced, the workflow is required to be resumed from the beginning because parameters and other information have changed and the files that are the source of the setup need to be updated. Therefore, in this case, the workflow is resumed from the process to be performed first among a plurality of processes defined in the workflow.

On the other hand, assuming that a problem occurs in the network and an error occurs that makes it impossible to communicate, and the network is made communicate by performing the handling to deal with the error, the workflow is able to be resumed from the process in which the error has occurred. Therefore, in this case, the workflow is resumed from the process in which the error has occurred among a plurality of processes defined in the workflow.

Furthermore, assuming that an error occurs in the process of onboarding a virtual machine image (i.e., pattern or template) and, as the handling to deal with the error, a user manually onboards the virtual machine image, then the process in which the error has occurred can be assumed to be already performed by the manual handling by the user. Therefore, in this case, the workflow is resumed from the process following the process in which the error has occurred among a plurality of processes defined in the workflow.

It should be noted that, when the workflow controller unit 153 determines that the process in which the error has occurred is a skippable process, the workflow controller unit 153 may do nothing as the handling to deal with the error and resume the workflow from the process following the process in which the error has occurred among a plurality of processes defined in the workflow.

For example, in case of executing the workflow that performs installation and other construction processes on a large number of nodes in sequence, when the node in which an error has occurs is a node that does not affect the overall configuration, the workflow controller unit 153 may skip the processes onto the node concerned and proceed with the processes onto other nodes first.

Figure 13:
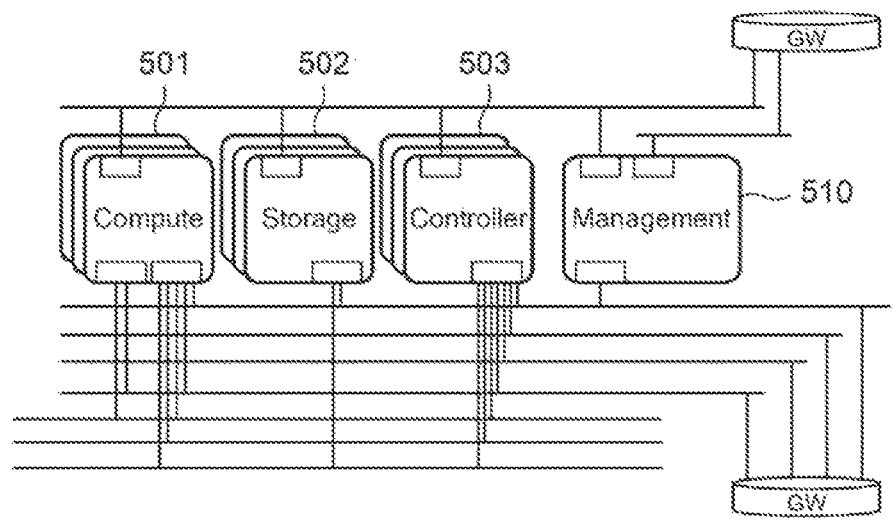
FIG. 13 is a schematic diagram illustrating an exemplary structure of a virtualized infrastructure constituting a central data center.

FIG. 13 is a schematic diagram illustrating an exemplary structure of a virtualized infrastructure that constitutes a central data center (i.e., CDC). As shown in FIG. 13, the virtualized infrastructure includes a management node 510 and other physical servers such as a compute node 501, a storage node 502, and a controller node 503.

Here, a management node 510 bears a role of installing and monitoring software of respective nodes 501, 502, and 503, as well as a rule of providing a user interface to allow operations on respective nodes 501, 502, and 503.

The controller node 503 governs operations related to a life cycle of the virtual machines and is configured to have a redundant configuration with three devices.

It should be noted that, similarly to the CDC, each of the edge data centers (i.e., GCs) and the regional data centers (i.e., RDCs) may also include the management node and the controller node having the redundant configuration with three devices.

As described above, the management node 510 bears the role as a software installer for the respective nodes 501, 502, and 503. Therefore, the management node 510 is an essential node for constructing the network.

Also, the controller node 503, which has a redundant configuration with three devices, is not any more able to maintain the redundant configuration when a failure occurs in two or more nodes. Therefore, the controller node 503 must have two or more nodes operating normally.

In other words, in case that a node that bears a management role or a node that affects the overall configuration fails, and in case that a node that bears a controller role fails in such a number that the redundant configuration cannot be maintained, it is necessary to stop the entire workflow, to perform the handling such as replacing the housing or replacing hardware components, and to resume the workflow after the handling is performed.

On the other hand, in case that a node that does not bear a management role or does not affect the overall configuration fails, it is possible to exclude the failed node and perform the processing onto the other nodes first. In this case, after a series of network construction processes are completed by resuming the workflow, it is possible to replace the enclosure or replace hardware components as the handling to deal with the process in which the error has occurred and to re-run the process in which the error has occurred. The workflow controller unit 153 may be provided with an error handling re-run unit that re-run the process in which the error has occurred.

It should be noted that, even when a node that does not bear a management role or a node that does not affect the overall configuration has failed, in case that, for example, there is enough time in the network construction schedule, it is preferable to stop the workflow to perform the handling to deal with the error with respect to the failed node concerned, and resume the workflow after the handling is performed to deal with the error.

As described above, the network management section 150, which serves as the network management apparatus according to the present embodiment, stops executing a workflow that defines a series of network construction processes consisting of a plurality of processes when an error occurs during the workflow being executed, and performs the handling to deal with the error to resume the workflow. At this time, the network management section 150 collects logs related to the execution of the workflow during the workflow being executed, and when an error occurs and the workflow is stopped, determines the handling to deal with the error based on the collected logs to perform the handling determined.

More particularly, the network management section 150 refers to, based on the collected logs, the correlating information that correlates errors that may occur when executing the workflow to ways of resolving errors, and determines the handling to deal with the error concerned to perform the handling determined. When the error is resolved by performing the handling to deal with the error, the network management section 150 resumes the workflow from the process corresponding to the above handling among a plurality of processes defined in the workflow.

In this way, when an error occurs during the workflow being executed, the network management section 150 determines and performs the handling to deal with the error based on the logs. Therefore, an operator who performs the network construction work does not need to identify the cause of a problem by analyzing the notified alerts and logs and take action to deal with the problem.

Telecom networks are large-scale, and recent telecom networks are virtualized networks constituted with multiple layers by multiple vendors. Furthermore, in many cases, a large number of departments in charge (or persons or companies) are involved in the construction work of the telecom network. For this reason, when humans are required to manually identify the cause of a problem and manually select where to request the analysis, it would entail a considerable amount of time and labors.

According to the present embodiment, as described above, the network management section 150 is capable of determining the handling to deal with an error based on logs during the workflow being executed, thus it makes it possible to reduce the amount of works by operators (i.e., labor and time) otherwise required for operators. In this way, it makes it possible to reduce the burden of operators and achieve labor savings, thereby reducing human costs. In addition, it also makes it possible to shorten the time until the problem handling is completed. Therefore, it makes it possible to shorten the down time of the construction work until the problem handling is completed. As a result, it makes it possible to shorten the time required for the overall construction work.

Furthermore, when resuming the workflow, the network management section 150 resumes the workflow from the process that corresponds to the handling performed to deal with the error concerned. More particularly, the network management section 150 may resume the workflow, according to the handling performed to deal with the error, from any of following processes: a process to be performed first; a process in which an error has occurred; and a process following the process in which an error has occurred, among a plurality of processes defined in the workflow.

Therefore, it makes it possible to avoid unnecessarily performing duplicating processes, thereby eliminating unnecessary execution time. As a result, it makes it possible to reduce the overall construction work time more appropriately.

It should be noted that from which process to resume the workflow may be determined based on the resuming step number, which is associated with the error concerned and the way of resolving error in the correlating information. As a result, it makes it possible to identify the process from which to resume the workflow more easily and appropriately.

Here, the network management section 150 is able to refer to, based on the logs collected during the workflow being executed, the correlating information, in which errors are mapped to ways of resolving errors, respectively, and determine whether or not it is possible to automatically perform the handling processing to resolve the error that has occurred during the workflow being executed. When it is determined to be possible to automatically perform the handling processing, the network management section 150 may automatically perform the handling processing concerned, and when it is determined to be not possible to automatically perform the handling processing, the network management section 150 may instruct a user 300 to perform the handling or take action to resolve the error.

More particularly, when the way of resolving error, which is associated with the error in the correlating information, is to perform the handling processing that requires no human intervention, the network management section 150 may determine that it is possible to automatically perform the handling processing and then automatically perform the handling processing.

On the other hand, when the way of resolving error, which is associated with the error in the correlating information, is to perform the handling processing that requires human intervention, the network management section 150 determines that it is not possible to automatically perform the handling processing. The network management section 150 may then instruct a user 300 to perform the handling or take action as handling to resolve the error.

Furthermore, when the way of resolving error corresponding to the error is not found in the correlating information, the network management section 150 may determine that it is not possible to automatically perform the handling processing. The network management section 150 may then instruct a user 300 to analyze the error and perform the handling or take action to resolve the error concerned.

As described above, by referring to the correlating information based on the collected logs, it makes it possible to automatically determine the handling to deal with an error and appropriately perform the handling determined. It should be noted that whether or not it is possible to automatically perform the handling processing may be determined using the auto-run flag associated with the error in the correlating information. Therefore, it makes it possible to determine whether or not it is possible to automatically perform the handling processing more easily and appropriately, and to automatically perform the handling processing or notify a user 300 more expeditiously with higher accuracy.

Furthermore, in case that an error occurs during the workflow being executed, by analyzing the logs of components related to the process in which the error has occurred, it makes it possible to efficiently make decisions on the handling to deal with the error.

As described above, according to the present embodiment, it makes it possible to shorten the overall construction time and reduce the human costs required to deal with errors in a large-scale network.

The network management apparatus according to the present embodiment may be implemented in any of general-purpose servers that constitute the backhaul network, the core network, or the like, of the mobile network 100. Alternatively, the network management apparatus may be implemented in a dedicated server. The network management apparatus may also be implemented on a single or a plurality of computers.

Figure 14:
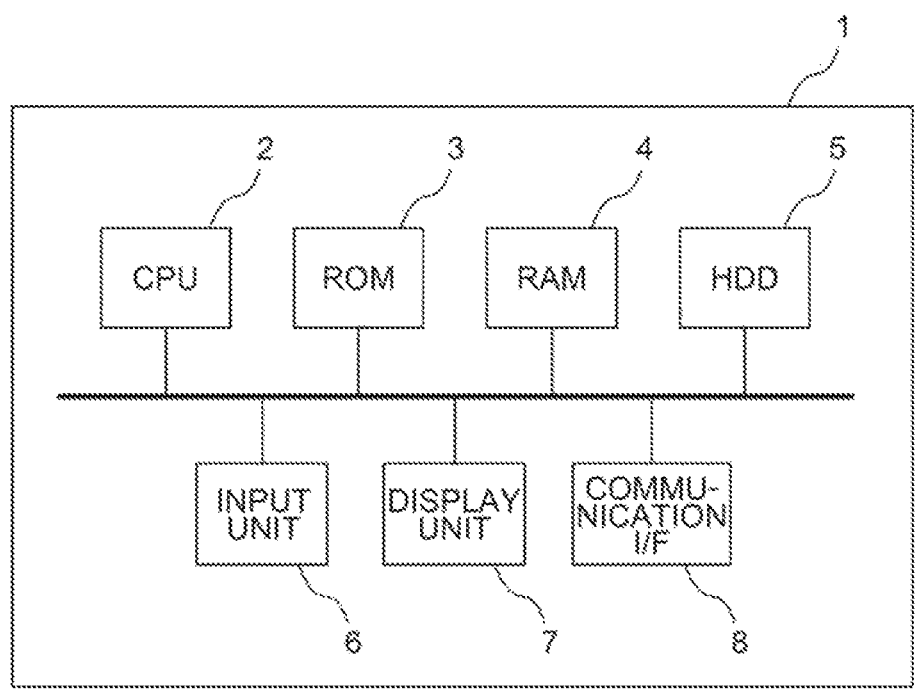
FIG. 14 is a block diagram illustrating an exemplary hardware configuration of the network management apparatus.

When the network management apparatus is implemented on a single computer, as shown in FIG. 14, the network management apparatus 1 may include a CPU 2, a ROM 3, a RAM 4, an HDD 5, an input unit (e.g., keyboard, pointing device, or the like) 6, a display unit (e.g., monitor, or the like) 7, a communication I/F 8, and the like. In this case, at least a part of the functions of the constituent elements of the network management section 150 shown in FIG. 3 may be performed by executing the program by the above CPU 2. However, at least a part of the constituent elements of the network management section 150 shown in FIG. 3 may be operated as dedicated hardware. In this case, the dedicated hardware operates based on the control of the above CPU 2.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

11: Base Station; 12: Edge Data Center; 13: Regional Data Center; 14: Central Data Center; 100: Mobile Network; 110: NFVI; 120: VNF; 130: MANO; 131: NFVO; 132: VNFM; 133: VIM; 140: OSS/BSS; 150: Network Management Section; 150*a*: Error Handling Database; 151: Log Collection Unit; 152: Log Analysis Unit; 153: Workflow Controller Unit; 153*a*: Workflow Stop Unit; 153*b*: Error Handling Performing Unit; 153*c*: Workflow Resuming Unit; 154: User Interface

What is claimed is:

1. A network management apparatus, comprising:
   at least one memory configured to store program code; and
   electronic circuitry including at least one processor, the at least one processor being configured to read and operate according to the program code to:
   execute a workflow for network construction comprising a plurality of processes configured to onboard virtual machines onto a plurality of servers;
   store correlating information that correlates an error that may occur when executing the workflow for network construction to a way of resolving the error;
   collect logs related to executing the workflow for network construction;
   stop executing the workflow for network construction when an error occurs during the workflow being executed;
   in a state in which the execution of the workflow is stopped, refer to the correlating information based on the logs and determine a handling to resolve the error;
   perform no handling to resolve the error when a process in which the error has occurred is determined to be skippable, wherein the process in which the error has occurred is determined to be skippable in a state in which the process is not being executed on a management node among a plurality of nodes; and
   resume, when the error is resolved by the handling, executing the workflow for network construction from a process corresponding to the handling among the plurality of processes, or resume, when the process in which the error has occurred is determined to be skippable, executing the workflow from a process following the process in which the error has occurred among the plurality of processes.

2. The network management apparatus according to claim 1, wherein the at least one processor is further configured to read and operate according to the program code to:
   refer to the correlating information based on the logs, and determine whether or not it is possible to automatically perform handling processing to resolve an error that has occurred during the workflow being executed, and
   when it is determined to be possible to automatically perform the handling processing, perform the handling processing, and when it is determined to be not possible to automatically perform the handling processing, instruct an operator to perform a handling to resolve the error that has occurred.

3. The network management apparatus according to claim 2, wherein the at least one processor is further configured to read and operate according to the program code to:
   determine that it is not possible to automatically perform the handling processing when the handling processing is determined to require human intervention, and instruct the operator, as the handling, to perform the handling processing.

4. The network management apparatus according to claim 2, wherein the at least one processor is further configured to read and operate according to the program code to:
   determine that it is not possible to automatically perform the handling processing when there is no way of resolving the error that is correlated to the error that has occurred during the workflow being executed in the correlating information, and instruct the operator, as the handling, to analyze the error and perform the handling processing to resolve the error.

5. The network management apparatus according to claim 1, wherein the at least one processor is further configured to read and operate according to the program code to:
   store, as the correlating information, information for identifying a process to be resumed, correlating the error and the way of resolving the error thereto.

6. The network management apparatus according to claim 1, wherein the at least one processor is further configured to read and operate according to the program code to:
   resume executing the workflow from any one of a process to be performed first, a process in which the error has occurred, and a process following the process in which the error has occurred among the plurality of processes.

7. The network management apparatus according to claim 1, wherein the at least one processor is further configured to read and operate according to the program code to:
   analyze logs for a component related to the process in which the error has occurred among the logs collected.

8. The network management apparatus according to claim 1, wherein the at least one processor is further configured to read and operate according to the program code to:
   after the execution of the workflow is resumed and the series of network construction processes are completed, perform the handling corresponding to the process in which the error has occurred and rerun the process in which the error has occurred, when the process in which the error has occurred is determined to be a skippable process and perform no handling to deal with the error.

9. The network management apparatus according to claim 1, wherein the plurality processes comprise:
   configuring a plurality of servers constituting network function virtualization infrastructure; and
   installing a plurality of virtual machines on the network function virtualization infrastructure to implement network functions.

10. A network management method performed by a network management apparatus, comprising steps of:
    executing a workflow for network construction comprising a plurality of processes configured to onboard virtual machines onto a plurality of servers;
    acquiring correlating information that correlates an error that may occur when executing the workflow for network construction to a way of resolving the error;
    collecting logs related to executing the workflow for network construction;
    stopping executing the workflow for network construction when an error occurs during the workflow being executed;
    in a state in which the execution of the workflow is stopped, referring to the correlating information based on the logs and determining a handling to resolve the error;
    performing no handling to resolve the error when a process in which the error has occurred is determined to be skippable, wherein the process in which the error has occurred is determined to be skippable in a state in which the process is not being executed on a management node among a plurality of nodes; and
    resuming, when the error is resolved by performing the handling, executing the workflow for network construction from a process corresponding to the handling among the plurality of processes, or resuming, when the process in which the error has occurred is determined to be skippable, executing the workflow from a process following the process in which the error has occurred among the plurality of processes.

11. A network management system, comprising:

at least one memory configured to store program code; and electronic circuitry including at least one processor, the at least one processor being configured to read and operate according to the program code to:

execute a workflow for network construction comprising a plurality of processes configured to onboard virtual machines onto a plurality of servers;

store correlating information that correlates an error that may occur when executing the workflow for network construction to a way of resolving the error;

collect logs related to executing the workflow for network construction;

stop executing the workflow for network construction when an error occurs during the workflow being executed;

in a state in which the execution of the workflow is stopped, refer to the correlating information based on the logs and determine a handling to resolve the error;

perform no handling to resolve the error when a process in which the error has occurred is determined to be skippable, wherein the process in which the error has occurred is determined to be skippable in a state in which the process is not being executed on a management node among a plurality of nodes; and resume, when the error is resolved by the handling, executing the workflow for network construction from a process corresponding to the handling among the plurality of processes, or resume, when the process in which the error has occurred is determined to be skippable, executing the workflow from a process following the process in which the error has occurred among the plurality of processes.

* * * * *